May 5, 1936.  H. KILFITT  2,040,018
PHOTOGRAPHIC CAMERA
Filed Nov. 1, 1933  4 Sheets-Sheet 1

Inventor
Heinz Kilfitt,
by Marks. Appleman
attorney

May 5, 1936.  H. KILFITT  2,040,018
PHOTOGRAPHIC CAMERA
Filed Nov. 1, 1933  4 Sheets-Sheet 2

Inventor
Heinz Kilfitt

May 5, 1936. H. KILFITT 2,040,018
PHOTOGRAPHIC CAMERA
Filed Nov. 1, 1933 4 Sheets-Sheet 3

Inventor
Heinz Kilfitt

Inventor
Heinz Kilfitt
By Thomas Appleman
Atty.

Patented May 5, 1936

2,040,018

UNITED STATES PATENT OFFICE 2,040,018

PHOTOGRAPHIC CAMERA

Heinz Kilfitt, Dusseldorf, Germany, assignor to Otto Berning & Co., Schwelm, Germany, a firm of Germany Application November 1, 1933, Serial No. 696,251
In France September 8, 1933

10 Claims.  (Cl. 95—31)

The invention relates to a photographic camera intended primarily for taking film strips, such as, for example, cinematograph films or narrow films, which in use works largely automatically but in its general arrangement, however, can be made very simple and inexpensively, and in which the novel internal construction permits a particularly small external form of the whole apparatus.

The accompanying drawings show an embodiment of the invention as an example.

Figure 1:
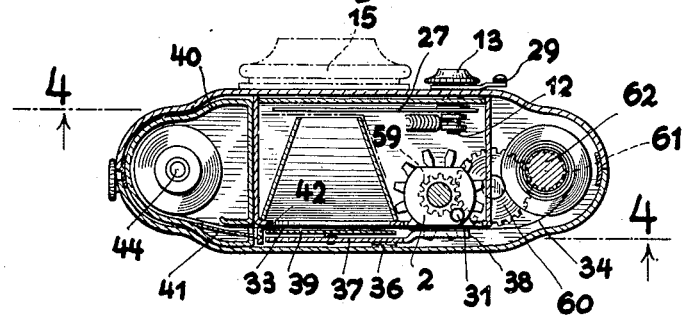
Fig. 1 is a longitudinal section of the camera on the line 1—1 of Fig. 2.

It is known with such cameras as are intended for taking film strip, to make use of the perforations of the film for the measuring-off of the size of picture. According to the invention however, the movement of the film strip and with it the rotation of the feed sprocket rollers are used not only for measuring off the size of the picture and the simultaneous tensioning of the shutter, but also for regulating the operation of a flat pressing plate for the film, the pressure of which on the measured-off part of the film is temporarily relieved.

In such apparatus in which the film is moved forward by a conveyer roller engaging in the perforations thereof and is unwound from one spool and wound on the other spool, a device must be provided by means of which the increasing circumference of the winding spool is compensated. If such a device were not provided, then after the circumference of the winding spool had been made constantly larger by the film strip already wound thereon, more film would be wound up than is actually intended to be moved forward by the conveyer roller. In such cases, special devices have hitherto been provided, for example the winding spool was arranged to be resiliently slidable on the winding spindle or the connection between the conveyer roller and the winding spool was resiliently slidable.

With the arrangement according to the present invention, no apparent attention has been paid to the increase in size of the winding spool. There is a rigid connection, for example, by means of toothed wheel gearing 59, 60, 61, between the conveyer roller 2 and the winding spool 62.

With certain apparatus, for example, small picture cameras, particular lengths of film are always used. According to the invention, the gearing of the rigid connection between the film conveyer roller and the winding spool is so chosen that at the commencement less film is wound up than is fed forward by the conveyer roller, so that the film is not tightly wound on the spool core. After a certain number of exposures, however, this proportion changes as the circumference of the material on the winding spool has meanwhile slowly increased. Consequently, more film is now wound up than is moved forward by the conveyer roller. This, however, can no longer be considered a disadvantage as according to the invention, that portion of the film which was fed forward too quickly at the commencement and which is loosely wound on the spool core, is now gradually wound more tightly. In practice, it is shown that in this way a large number of exposures may be made without any resilient compensation being necessary.

By a suitable selection of the gearing and of the relation of the conveyer roller to the circumference of the film spool, the limits of the possible uses of the rigid connection according to the invention may be so extended that the device may be used in connection with the large number of exposures or pictures desired with small picture cameras.

This rigid connection between the conveyor roller and the film spool may on account of its rigidity be utilized in a very simple manner for counting the exposures. If, for example, a toothed wheel 59 of 24 teeth is used on the film roller and a toothed wheel 61 of 25 teeth on the carrier for the film spool, then with each revolution of the film conveyor roller (which, for example, would amount to the length of one picture), the position of the film spool carrier or driver would vary by one tooth space. A rotatable knob 1 fitted on the film carrier or driver or a reference mark 63 thereon would consequently be moved forward by a distance equal to one twenty-fourth of a complete turn after each picture change. The counting device is completed by arranging a suitable scale 64 beneath the rotatable knob 1. Since the toothed wheel transmission must already exist for the rigid connection above-described, the whole counting device therefore consists only of a single scale without any other parts. The general arrangement therefore means a considerable simplification of the whole mechanism, as separate devices for the counting gear and parts to compensate the increasing circumference of the film spool are superfluous.

Figure 2:
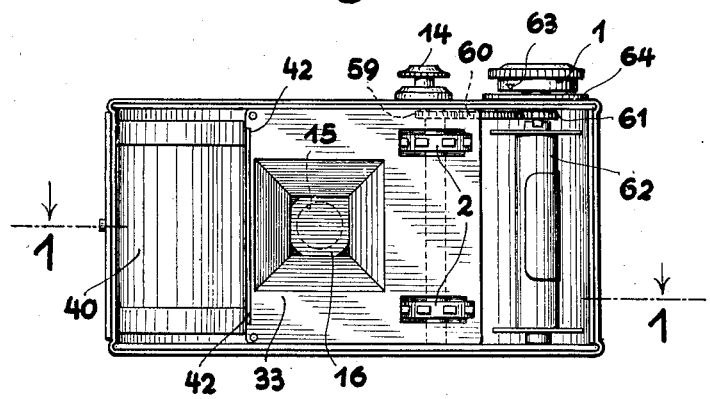
Fig. 2 is a plan view of the camera with cover removed.
Figure 3:
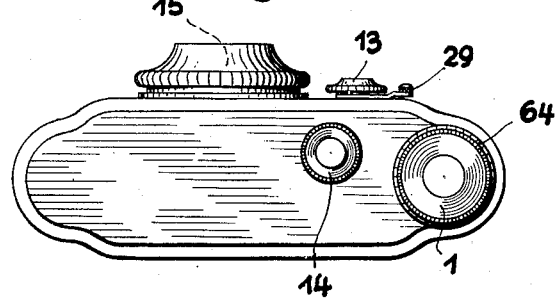
Fig. 3 is a side elevation of the camera.
Figure 4:
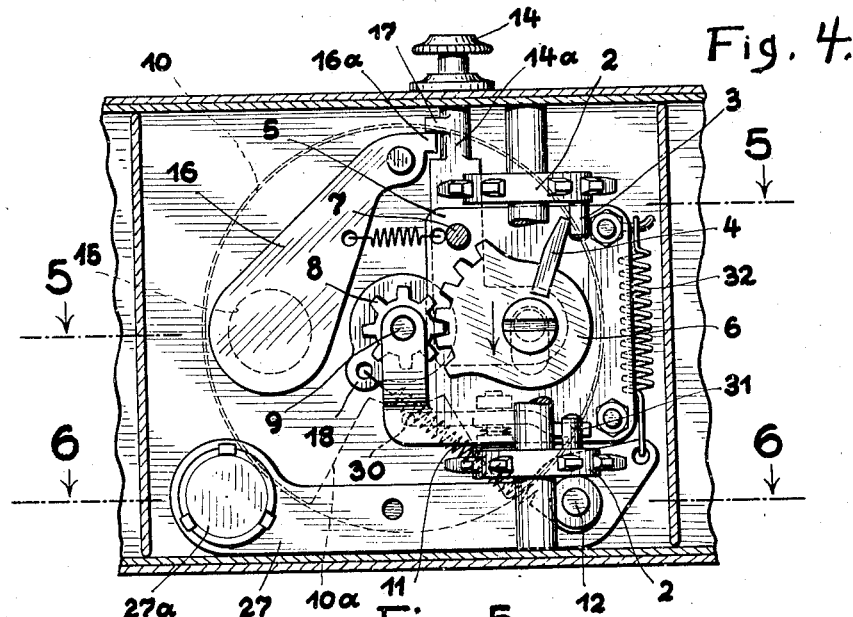
Fig. 4 is a sectional side elevation of the device for the film feed, for the dimensioning of the picture, for the tensioning and release of the objective shutter and for the actuation of the yellow filter.

When by means of the film feed knob 1 (Fig. 2) the film is moved forward, the film sprocket rollers 2 are carried around by the perforations. There is provided on one film sprocket roller a pin 3 (Fig. 4) which actuates the picture measuring-off device. On the rotation of the film sprocket roller 2, this pin 3 bears against the nose piece 4 of a rotatable toothed segment 6 mounted displaceably on the bearing plate 5 and displaces this nose piece forwardly up to a stop 7 provided on the said bearing plate. The measuring-off of the picture is thus effected. Pressure on a knob 14 projecting from the camera wall produces movement of the toothed segment 6 displaceably arranged on the bearing plate 5, in the direction of the arrow, by means of an elbow lever 14a, so that the nose piece 4 of the segment can slide off the pin 3 of the film roller and run back into its initial position. The toothed segment itself is in engagement with a toothed driving wheel 8 on the spindle 9, on which is fixed the apertured shutter disc 10. With the spindle 9 is connected a spring 11 for actuating the shutter and which is thus tensioned in the previously described operation and, on the sliding off of the nose piece 4 from the pin 3, brings back the toothed segment again into its initial position. The device is now free to measure off a fresh section of film.

With this measuring off movement, caused by the pin 3 of the film sprocket roller 2 through a nose piece 4 fitted on the toothed segment 6, the shutter for the objective is simultaneously tensioned. The apertured shutter disc 10 is arranged on the other side of the base plate. Upon rotation of the disc 10 by the revolution of the spindle 9 by means of the toothed segment 6 actuated by the pin 3 and engaging with the disc axle 9, this aperture 10a is carried in front of the exposure opening 15 in the camera wall while the spring 11 for returning the shutter disc 10 is simultaneously tensioned. No premature exposure, however, takes place with this movement or rotation of the shutter disc 10 caused by the movement for the picture measuring-off, since the objective opening 15 is then closed by the covering lever 16. Only when, by the pressure of the knob 14, the toothed segment 6 is moved and the nosepiece 4 is released by the pin 3 and thus the shutter disc 10 can move backwards, is the covering lever 16 raised, a projecting nosepiece 17 pressing on an arm 16a of the rotatable double armed covering lever. The objective opening is then left free and the shutter disc 10 rotating backwards, on the sliding back of the toothed segment 6, carries the aperture 10a past the objective opening 15 and the exposure takes place. On the release of the press knob 14, the objective opening is also closed at the back by the covering lever 16, so that the operation can be repeated. On the pressure of the knob 14, however, the exposure takes place simultaneously with the preparation for the fresh feed of the film. On the release of the knob, the safety covering of the objective opening takes place by the covering lever 16 as also the preparation for the fresh tensioning of the shutter.

The tension spring 11 for actuating the shutter, that is, the shutter disc 10, and for drawing this back on the release of the toothed segment 6 from the pin 3 by the actuation of the press knob 14, consists of a series of narrow and a number of wide turns. As is known, the elasticity of narrow turns is greater than that of wide turns of the same wire. The end of the wide turns of the spring 11, which spring engages at the other end of the narrow turns with a driver 18 on the spindle 9 of the apertured shutter disc 10, is so fixed on a spindle or roller 12 which is carried through the wall of the camera and carries a knob 13, that the wide turns of the spring can be, to a certain extent, rolled up and thus placed out of action. With the spring 11 not rolled up, only the less strongly acting wide turns are tensioned on the operation of the shutter disc. The more these are prevented from co-operating by being rolled up, the more the narrow turns are tensioned. In this way, the degree of the periods of exposure attainable by simple variation of the elasticity is considerably extended as the effect of two springs of different strength is combined in a single spring.

In order to impart a greater degree of variation to these periods of exposure, that is, to be able further to regulate them, there is provided a brake device which is shown in one embodiment by way of example in Figs. 13–16. The roller 12 serving for the tensioning of the shutter spring is provided with a cam disc 19. On this rests one arm 20a of an elbow lever, the other arm 20b of which carries the actual brake mechanism, which is brought into engagement with the spindle of the shutter disc through the driver disc 18 with stop nosepiece 21.

The brake mechanism consists of a casing 22 fixed on the arm 20b, and containing a toothed wheel 24 with a fork-shaped stop bar 23. A small toothed wheel 25 engages the toothed wheel 24 and is under the influence of an anchor brake 26. According to the inclination of the arm 20a produced by the cam disc 19, the arm 20b and with it the casing 22 is brought more or less close to the driver disc 18. The stop bar 23 engages correspondingly more or less over the nose 21 of the driver disc 18 and thus brakes the rotation thereof until by sufficient rotation of the toothed wheel 25 braked by the anchor 26 the stop bar 23 is moved out of the range of the driver nose 21. In the position shown in Fig. 13, the stop bar 23 remains out of engagement with the stop nose piece 21. The stop bar 23 needs more or less time, according to the position of adjustment of the stop nose 21, to release the latter, which can be seen from the diagrammatic representation of Figs. 15 and 16.

Figure 5:
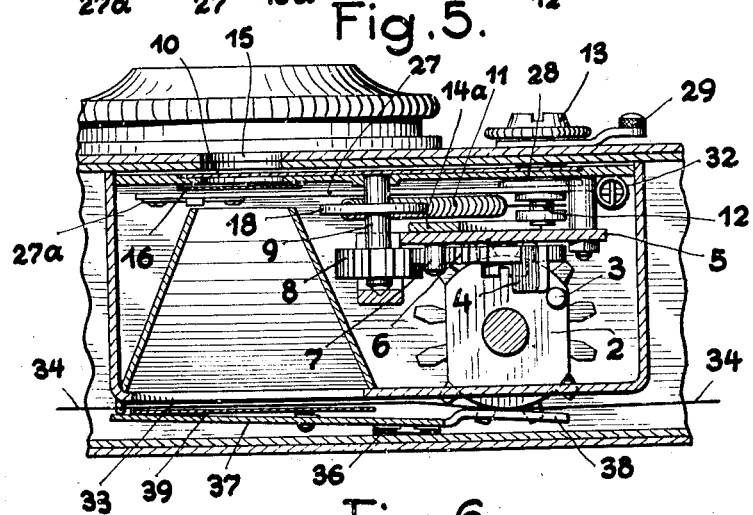
Fig. 5 is a section on the line 5—5 of Fig. 4.
Figure 6:
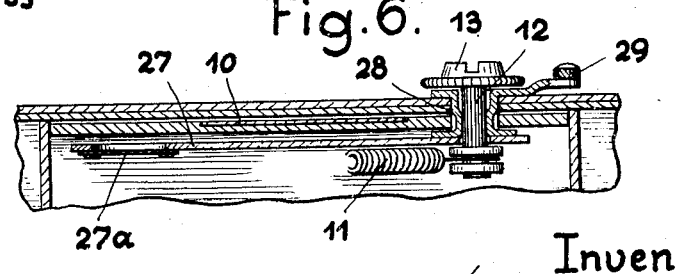
Fig. 6 is a section on the line 6—6 of Fig. 4.
Figure 7:
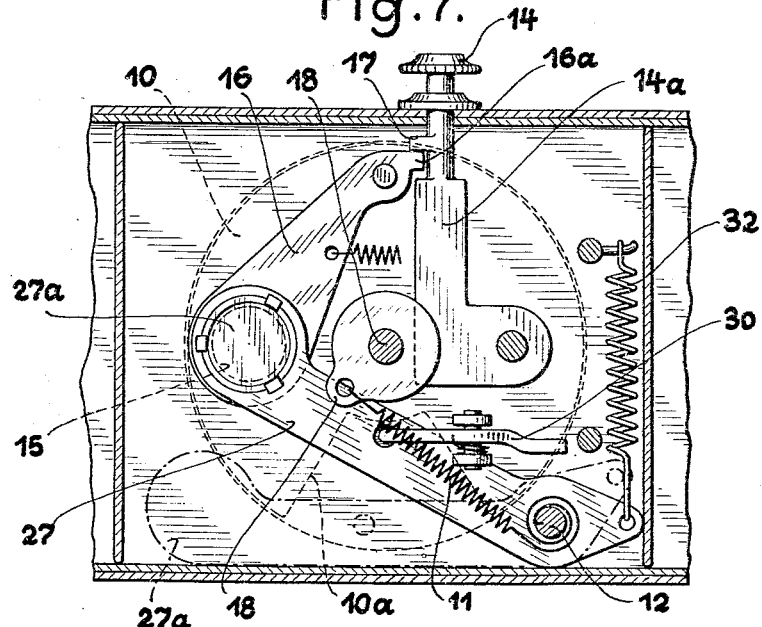
Fig. 7 is a sectional side elevation of the device for actuating the filter lever and the covering lever for the objective aperture.
Figure 8:
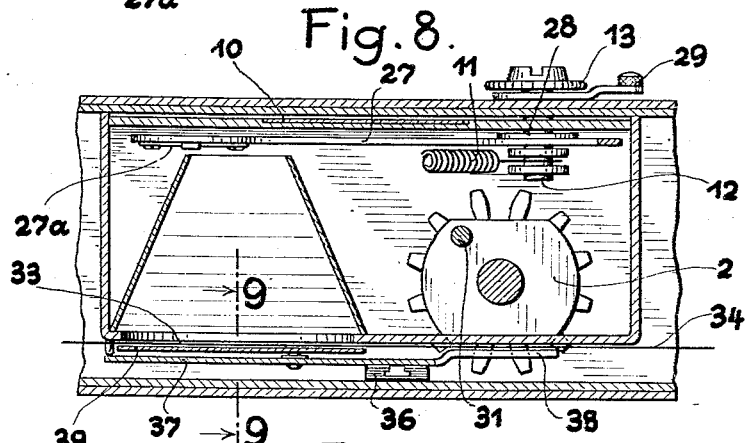
Fig. 8 is a sectional plan view of the apparatus for pressing the film strip on the film support.
Figure 9:
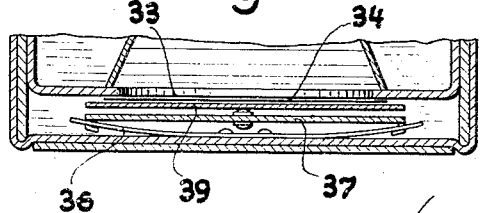
Fig. 9 is a section on the line 9—9 of Fig. 8.
Figure 10:
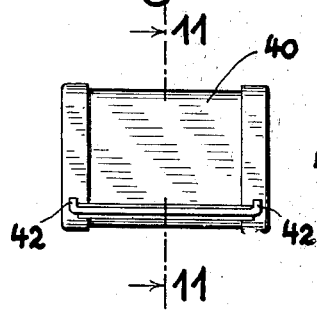
Fig. 10 is an end elevation of the film container.
Figure 11:
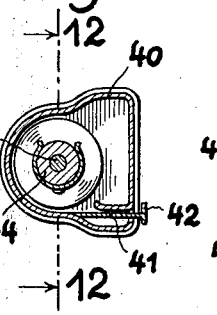
Fig. 11 is a section on the line 11—11 of Fig. 10.
Figure 12:
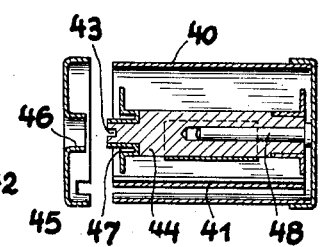
Fig. 12 is a section on line 12—12 of Fig. 11.
Figure 13:
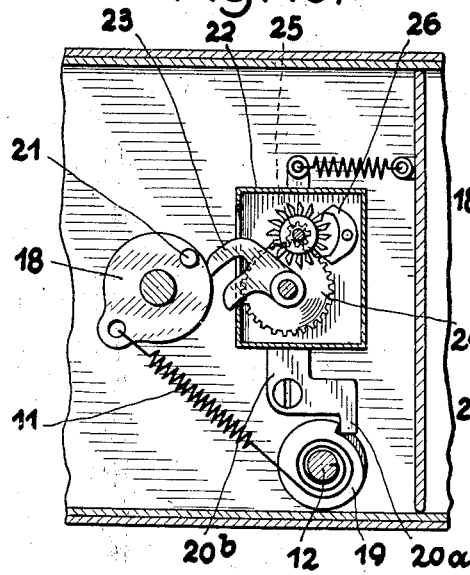
Fig. 13 is a sectional side elevation showing the brake mechanism for altering the period of exposure, when in the inoperative position.
Figure 14:
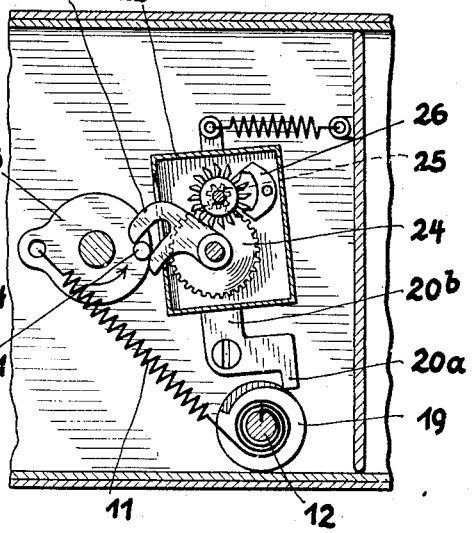
Fig. 14 is a similar view showing the brake mechanism in the operative position.
Figure 15:
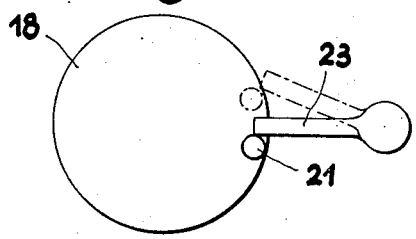
Figs. 15 and 16 show diagrammatically the method of operation of the braking mechanism.
Figure 16:
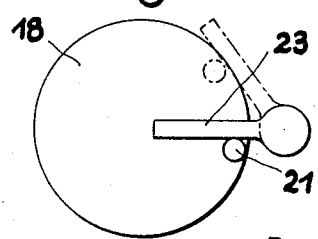

Inside the camera there is, furthermore, provided a rocking lever 27 which carries on its free end a yellow screen 27a. This lever 27 is rotatable on a sleeve 28 about the spindle 12 of a knob fitted on the outside of the camera in such manner that it may be rocked in front of the objective aperture. This knob also serves simultaneously for the tensioning of the spring 11 and the rendering operative of the brake mechanism 19 for the adjusting and regulation of the periods of exposure. The whole arrangement is now so contrived that on the rocking of the filter in front of the objective aperture, the spring which actuates the shutter disc is slackened, whereby therefore the period of exposure is automatically correspondingly lengthened. By the rotation of this knob 13, the spring 11 which actuates the shutter disc is wound up and tensioned. The spindle of the knob 13 is now carried through the hollow sleeve 28 of the yellow filter and so coupled with the sleeve, for example by friction, that on the tensioning of the spring 11, the inner spindle 12 rotates relatively to the sleeve 28 while with the rocking of the filter lever 27 towards the objective aperture and back, the knob spindle 12 is carried around, Figs. 4–6. Thus, on the rotation of the knob 13 for the regulation of the exposure period, the yellow filter 27a is not also actuated but on the rocking of the yellow filter by the rotation of the sleeve 28 by means of the knob 29, the exposure knob, the spindle 12 of which is carried for example positively by the sleeve 28 of the yellow filter, is rotated therewith. Thus, the spring on the moving forward of the yellow screen is slackened and the period of exposure is lengthened. The two terminal positions of the filter disc are ensured by a pip on the lever which snaps into notches of the base plate. With this device it is a matter of indifference how the time of exposure is adjusted as, on the rocking forward of the yellow filter, the spring tension will always be reduced, and on the rocking backwards it will be increased, whereby the duration of the time of exposure is influenced.

In order, however, to prevent the moving back of the filter which has been once moved forward, being forgotten with the following exposures, the yellow filter brought in front of the objective opening can be held in this position by a notch lever 30 adapted to drop in under the influence of a spring. This notch lever is, however, released after the exposure is made, on the forward feed of the film, by a pin 31 on the adjacently located film sprocket roller and the yellow filter returns under the action of the tension spring 32 into its inoperative position. Thus on the moving forward of the yellow filter, the period of exposure is automatically lengthened and on the moving back thereof is automatically shortened.

On the taking of the picture it is an absolute necessity that the film 34 should lie flat on the film support 33; also that on the forward feed of the film the sensitive layer should remain undamaged. With this object, there is provided on the inside of the detachable camera cover a pressing-on device, the pressing-on plate of which is brought into operation by the film feed roller being provided with flattened parts on the circumference. The carrier plate 37 is held on a leaf spring 36 fixed on the inside of the camera cover and rests by fork-shaped stops 38 on the film feed rollers 2. On the carrier plate is arranged the actual pressure plate 39 hinging about a center point. If now the stops 38 rest on the flattened surfaces of the film feed rollers 2, the leaf spring acts to the fullest extent and presses the carrier plate 37 and with it the actual pressure plate 39 forwards, so that the film strip 34 is pressed flat on the exposure flat on the film carrier 33. On the feed of the film, that is, on the rotation of the film feed rollers 2, these engage with their round circumferences the fork-like stops 38 and press these and with them the carrier plate 37 off the picture carrier so that the pressure of the pressing plate on the film strip is relieved and the free movement of the film is ensured on the forward feed.

Starting from the above-mentioned basic idea that the film strip must be insured against injury especially in its movements, the film pack which takes the spool with the film is specially made. With the known packs, a light-tight closing at the film passage slot of the pack and at the passage of the film spool centre pins is ensured by the application of velvet seats. The improved pack 40 has at its passage slot for the film a spring rail 41 which ordinarily covers the slot. This rail has at the two ends turned-over nose-pieces 42 which rest on the film carrier 33 when the pack is inserted. If now the cover of the camera is put on, the spring cover rail 41 is held by these nose pieces 42 in its position, while the pack itself is pressed down by the cover on to its seat. Hereby the cover rail 41 lifts from the passage slot of the pack and the latter is left free for an unhindered passage of the film strip. On the opening of the camera by the raising of the cover, the pack automatically lifts to such an extent that the spring cover rail 41 again closes the slot. The removal of the pack from the camera is also facilitated hereby. Also the pressing of the part of the film strip projecting from the pack and which serves for attaching to the opposite spool, has the advantage that it is not prematurely drawn back into the pack by the internal tension of the film, whereby a visit to the dark room is made unnecessary.

In order to attain a light-tight closing on the spool sides of the pack, first only the center pin 44 provided with a driver slot 43 is carried outwards through the removable side wall of the pack. The passage in the pack is made as a tube 46 which engages in an annular groove 47 located on the film spool. Any light penetrating between the spool pin 44 and the tube-like opening 46 would then have to pass through a member of angles before it could reach the film. The other side of the pack is entirely closed. Instead of a pin leading outwards, there is provided a pin 48 projecting inwards, upon which is fitted the spool 44 provided with a bore. As a further advantage of this entire pack construction, there is afforded a very short construction of the pack, as laterally projecting spool center pins as also the room for otherwise necessary seals, are dispensed with. The pack is thus suited to the other arrangements, taking up little space, of the internal camera parts.

Having now particularly described and ascertained the nature of my said invention and in what manner the same is to be performed, I declare that what I claim is:—

1. In a camera for strip films, a casing, means at one side of the casing to support a roll of unexposed film, means at the other side of the casing to support a winding wheel for winding film from the roll after exposure, a lens at the front of said camera, a film support positioned in the casing rearwardly of the lens and over which the film passes, a shutter controlling the passage of light from the lens to the film support, said shutter having an operating spring, means actuated by the rotation of said winding wheel for setting said shutter and tensioning said spring, latch means holding said shutter in set position, a release button having a stem engaging said latch means to release the shutter upon depression of the button, and a presser plate arranged upon actuation of the winding wheel to move away from the film support during feeding movement and to press the film against its support upon completion of the said feeding movement, said winding wheel having cam segments engaging the presser plate during rotation of the winding wheel.

2. In a camera for strip films, a casing having a lens opening, means at one side of the casing to support a roll of unexposed film, a rotatable winding reel at the other side of the casing whereon to wind film from the said means after exposure, a film support positioned in the rear of the casing rearwardly of the lens opening and over which the film passes, a shutter controlling the passage of light from the lens opening to the film on said support, an operating spring for said shutter having one end connected to a fixed point, a drum having the other end of the spring connected thereto and rotatable to tension the spring while the shutter is set in closed position, said drum being fixed to the shutter, an operative connection between the reel and drum to move the shutter and drum to set position after exposure, a latch holding the shutter and drum in set position when set, and a release button having a stem arranged to engage and release the latch upon depression of the button.

3. In a camera for strip films, a casing having a lens opening, means at one side of the casing to support a roll of unexposed film, a rotatable winding reel at the other side of the casing whereon to wind film from the said means after exposure, a film support positioned in the rear of the casing rearwardly of the lens opening and over which the film passes, a shutter controlling the passage of light from the lens opening to the film on said support, an operating spring for said shutter having one end connected to a fixed point, a drum having the other end of the spring connected thereto and rotatable to tension the spring while the shutter is set in closed position, said drum being fixed to the shutter, an operative connection between the reel and drum to move the shutter and drum to set position after exposure, a latch holding the shutter and drum in set position when set, a release button having a stem arranged to engage and release the latch upon depression of the button, and a second shutter normally covering said lens opening and engaged by the button stem to uncover said opening upon depression of the button.

4. In a camera for strip film, a casing having a lens opening, means at one side of the casing to support a roll of unexposed film, a rotatable winding reel at the other side of the casing whereon to wind film from the said means after exposure, a film support positioned in the rear of the casing rearwardly of the lens opening and over which the film passes, a shutter controlling the passage of light from the lens opening to the film on said support, an operating spring for said shutter having one end connected to a fixed point, a drum having the other end of the spring connected thereto and rotatable to tension the spring while the shutter is set in closed position, said drum being fixed to the shutter, an operative connection between the reel and drum to move the shutter and drum to set position after exposure, a latch holding the shutter and drum in set position when set, and a release button having a stem arranged to engage and release the latch upon depression of the button, said operative connection including a wheel geared to said reel, a stop pin on said wheel and a swinging lever normally in the path of said pin and having limited movement, said lever being movable out of the path of said pin by depression of said button, whereby the pin and lever form a releasable stop to limit the rotation of said reel.

5. In a camera for strip films, a casing having a lens opening, means at one side of the casing to support a roll of unexposed film, a rotatable winding reel at the other side of the casing whereon to wind film from the said means after exposure, a film support positioned in the rear of the casing rearwardly of the lens opening and over which the film passes, a shutter controlling the passage of light from the lens opening to the film on said support, an operating spring for said shutter having one end connected to a fixed point, a drum having the other end of the spring connected thereto and rotatable to tension the spring while the shutter is set in closed position, said drum being fixed to the shutter, an operative connection between the reel and drum to move the shutter and drum to set position after exposure, a latch holding the shutter and drum in set position when set, a release button having a stem arranged to engage and release the latch upon depression of the button, a lever pivoted in said casing and carrying a ray filter movable into and out of registry with the lens opening, a spring urging said lever out of such registry, means for moving the lever to bring the ray filter into such registry, latch means engaging the last lever to hold the filter in registry, and means controlled by the rotation of the reel to release the last latch.

6. In a camera for strip films, a casing having a lens opening, means at one side of the casing to support a roll of unexposed film, a rotatable winding reel at the other side of the casing whereon to wind film from the said means after exposure, a film support positioned in the rear of the casing rearwardly of the lens opening and over which the film passes, a shutter controlling the passage of light from the lens opening to the film on said support, an operating spring for said shutter having one end connected to a fixed point, a drum having the other end of the spring connected thereto and rotatable to tension the spring while the shutter is set in closed position, said drum being fixed to the shutter, an operative connection between the reel and drum to move the shutter and drum to set position after exposure, a latch holding the shutter and drum in set position when set, a release button having a stem arranged to engage and release the latch upon depression of the button, a second shutter normally covering said lens opening and engaged by the button stem to uncover said opening upon depression of the button, a lever pivoted in said casing and carrying a ray filter movable into and out of registry with the lens opening, a spring urging said lever out of such registry, means for moving the lever to bring the ray filter into such registry, latch means engaging the last lever to hold the filter in registry, and means controlled by the rotation of the reel to release the last latch.

7. In a camera for strip films, a casing having a lens opening, means at one side of the casing to support a roll of unexposed film, a rotatable winding reel at the other side of the casing whereon to wind film from the said means after exposure, a film support positioned in the rear of the casing rearwardly of the lens opening and over which the film passes, a shutter controlling the passage of light from the lens opening to the film on said support, an operating spring for said shutter having one end connected to a fixed point, a drum having the other end of the spring connected thereto and rotatable to tension the spring while the shutter is set in closed position, said drum being fixed to the shutter, an operative connection between the reel and drum to move the shutter and drum to set position after exposure, a latch holding the shutter and drum in set position when set, a release button having a stem arranged to engage and release the latch upon depression of the button, said operative connection including a wheel geared to said reel, a stop pin on said wheel and a swinging lever normally in the path of said pin and having limited movement, said lever being movable out of the path of said pin by depression of said button, whereby the pin and lever form a releasable stop to limit the rotation of said reel, a lever pivoted in said casing and carrying a ray filter movable into and out of registry with the lens opening, a spring urging said lever out of such registry, means for moving the lever to bring the ray filter into such registry, latch means engaging the last lever to hold the filter in registry, and means controlled by the rotation of the reel to release the last latch.

8. In a camera for strip films, a casing having a lens opening, means at one side of the casing to support a roll of unexposed film, a rotatable winding reel at the other side of the casing whereon to wind film from the said means after exposure, a film support positioned in the rear of the casing rearwardly of the lens opening and over which the film passes, a shutter controlling the passage of light from the lens opening to the film on said support, an operating spring for said shutter having one end connected to a fixed point, a drum having the other end of the spring connected thereto and rotatable to tension the spring while the shutter is set in closed position, said drum being fixed to the shutter, an operative connection between the reel and drum to move the shutter and drum to set position after exposure, a latch holding the shutter and drum in set position when set, a release button having a stem arranged to engage and release the latch upon depression of the button, a presser plate carried by the rear wall of said casing and spring urged against said film support, and cam means included in the operative connection and engaging the presser plate to move the same away from the film support as the reel is rotated.

9. In a camera for strip films, a casing having a lens opening, means at one side of the casing to support a roll of unexposed film, a rotatable winding reel at the other side of the casing whereon to wind film from the said means after exposure, a film support positioned in the rear of the casing rearwardly of the lens opening and over which the film passes, a shutter controlling the passage of light from the lens opening to the film on said support, an operating spring for said shutter having one end connected to a fixed point, a drum having the other end of the spring connected thereto and rotatable to tension the spring while the shutter is set in closed position, said drum being fixed to the shutter, an operative connection between the reel and drum to move the shutter and drum to set position after exposure, a latch holding the shutter and drum in set position when set, a release button having a stem arranged to engage and release the latch upon depression of the button, said operative connection including a wheel geared to said reel, a stop pin on said wheel and a swinging lever normally in the path of said pin and having limited movement, said lever being movable out of the path of said pin by depression of said button, whereby the pin and lever form a releasable stop to limit the rotation of said reel, a presser plate carried by the rear wall of said casing and spring urged against said film support, and cam means on the wheel engaging the presser plate to move it away from the film support as the reel is rotated.

10. In a camera for strip films, a casing having a lens opening, means at one side of the casing to support a roll of unexposed film, a rotatable winding reel at the other side of the casing whereon to wind film from the said means after exposure, a film support positioned in the rear of the casing rearwardly of the lens opening and over which the film passes, a shutter controlling the passage of light from the lens opening to the film on said support, an operating spring for said shutter having one end connected to a fixed point, a drum having the other end of the spring connected thereto and rotatable to tension the spring while the shutter is set in closed position, said drum being fixed to the shutter, an operative connection between the reel and drum to move the shutter and drum to set position after exposure, a latch holding the shutter and drum in set position when set, a release button having a stem arranged to engage and release the latch upon depression of the button, said operative connection including a wheel geared to said reel, a stop pin on said wheel and a swinging lever normally in the path of said pin and having limited movement, said lever being movable out of the path of said pin by depression of said button, whereby the pin and lever form a releasable stop to limit the rotation of said reel, a shaft whereon said wheel is fixed, a second wheel on said shaft, and teeth projecting from said wheels to engage openings in the edge of a film.

HEINZ KILFITT.